(12) United States Patent
Löscher

(10) Patent No.: US 12,503,187 B2
(45) Date of Patent: Dec. 23, 2025

(54) MOUNT FOR A HANDHELD ELECTRONIC DEVICE

(71) Applicant: ANNEX PRODUCTS PTY. LTD., South Yarra (AU)

(72) Inventor: Martin Karl Löscher, Fitzroy (AU)

(73) Assignee: ANNEX PRODUCTS PTY. LTD., South Yarra (AU)

( * ) Notice: Subject to any disclaimer, the term of this patent is extended or adjusted under 35 U.S.C. 154(b) by 178 days.

(21) Appl. No.: 18/231,651

(22) Filed: Aug. 8, 2023

(65) Prior Publication Data
US 2025/0050960 A1   Feb. 13, 2025

(51) Int. Cl.
*B62J 11/00*   (2020.01)

(52) U.S. Cl.
CPC .................................. *B62J 11/00* (2013.01)

(58) Field of Classification Search
CPC ................. B62J 11/00; F16M 11/12
USPC ..... 224/413, 420, 443, 282, 929; 248/276.1, 248/278.1; 403/97
See application file for complete search history.

(56) References Cited

U.S. PATENT DOCUMENTS

| | | | | |
|---|---|---|---|---|
| 5,016,851 A * | 5/1991 | Koskinen | ............ | B60R 11/0241 248/278.1 |
| 5,692,721 A * | 12/1997 | Roberts | ............ | B60R 11/00 248/292.12 |
| 6,244,553 B1 * | 6/2001 | Wang | ............ | F16M 11/2021 379/454 |
| 6,669,155 B2 * | 12/2003 | Ron | ............ | F16C 11/10 248/176.1 |
| 7,513,473 B2 * | 4/2009 | Lu | ............ | F16M 11/10 248/921 |
| 7,641,162 B2 * | 1/2010 | Tsay | ............ | F16M 11/043 248/921 |
| 8,235,265 B2 * | 8/2012 | Barnes | ............ | B62J 11/00 224/419 |
| 8,708,205 B2 * | 4/2014 | Wotton | ............ | B62J 11/00 224/451 |
| 8,757,460 B1 * | 6/2014 | Barnes | ............ | B62J 11/00 224/443 |
| 8,800,830 B2 * | 8/2014 | Hoshi | ............ | B62K 11/14 224/450 |
| 10,569,717 B2 * | 2/2020 | Peters | ............ | F16B 2/04 |
| D941,760 S * | 1/2022 | Ryan | ............ | D13/108 |
| 11,303,143 B2 * | 4/2022 | Taylor | ............ | H02J 7/02 |
| RE50,098 E * | 8/2024 | Peters | ............ | F16B 7/025 |

(Continued)

FOREIGN PATENT DOCUMENTS

TW    M626582 U   5/2022
WO    2019006494   1/2019

OTHER PUBLICATIONS

Klock Werks, "Phone Mounts for Harley-Davidson®," accessed on the Internet at: https://getklocked.com/products/iomounts-magnetic-phone-mounts-harley-davidson (believed publicly available prior to August 9, 2023).

(Continued)

*Primary Examiner* — Justin M Larson
(74) *Attorney, Agent, or Firm* — Barnes & Thornburg LLP

(57) ABSTRACT

A mount for mounting to a clamp of a clutch mount of a motorcycle a handheld electronic device. The mount includes a mount body, a pair of bolts, a pivot spacer, a knuckle, a handheld electronic device mount and a fastener for securing the components together.

16 Claims, 4 Drawing Sheets

(56) References Cited

U.S. PATENT DOCUMENTS

| | | | | |
|---|---|---|---|---|
| 2001/0046409 | A1* | 11/2001 | Fischer | B60R 11/02 |
| | | | | 403/92 |
| 2011/0062299 | A1* | 3/2011 | Tsai | F16M 11/2057 |
| | | | | 248/231.41 |
| 2019/0009850 | A1 | 1/2019 | Peters | |
| 2024/0343331 | A1* | 10/2024 | Loscher | B62K 11/14 |
| 2025/0050960 | A1* | 2/2025 | Löscher | B62J 11/00 |

OTHER PUBLICATIONS

RAM®, "X-Grip® Large Phone Mount with Brake/Clutch Reservoir Base," accessed on the Internet at: https://rammount.com/products/ram-b-174-un10 (May 12, 2023).

Tackform, "Brake/Clutch Reservoir Motorcycle Phone Mount," accessed on the Internet at: https://www.amazon.com/Brake-Clutch-Reservoir-Motorcycle-Phone/dp/B07GVPMVZ1 (Aug. 27, 2018).

BikePenR Z1 Garmin Mount Manual [Retrieved from internet Oct. 18, 2024] <URL:https://web.archive.org/web/20220705214844/https://www.bikepenr.nl/wp-content/uploads/Z-1-Garmin.pdf> Published on Jul. 5, 2022 as per Wayback Machine.

Harley-Davidson SP Connect Phone Mount [Viewed on internet Oct. 18, 2024] <URL: https://www.youtube.com/watch?v=6Ck7qOnVUbl> Published Sep. 1, 2021.

International Search Report and Written Opinion from corresponding PCT Application No. PCT/AU2024/050843 (Oct. 23, 2024).

Written Opinion from corresponding PCT Application No. PCT/AU2024/050843 (Oct. 23, 2024).

* cited by examiner

MOUNT FOR A HANDHELD ELECTRONIC DEVICE

BACKGROUND

The present disclosure relates to a mount for a handheld electronic device.

SUMMARY

The present disclosure is directed to a mount for mounting a handheld electronic device to a clamp of a brake clutch of a motorcycle defining a pair of clamp holes. The mount comprises a mount body defining a pair of mount body holes; a pair of spacers for spacing the mount body from the clamp when the mount is secured to the clamp, each spacer defining a spacer hole; a pair of bolts, each bolt receivable by a respective mount body hole, a respective spacer hole and a respective clamp hole for securing the mount to the clamp; a pivot spacer selectively positionable relative to the mount body during assembly of the mount; a knuckle selectively positionable relative to the pivot spacer during assembly of the mount; a handheld electronic device mount selectively positionable relative to the knuckle; and a fastener for rigidly securing the pivot spacer and the knuckle to the mount body. The pivot spacer may be rotatable relative to the mount body during assembly of the mount to selectively position the pivot pin relative to the mount body. The knuckle may be rotatable relative to the pivot spacer during assembly of the mount to selectively position the knuckle relative to the pivot spacer. The handheld electronic device mount may be rotatable relative to the knuckle during assembly of the mount to selectively position the handheld electronic device mount relative to the knuckle.

The mount body may include a longitudinal axis and a plurality of first ribs extending parallel to the axis and wherein the pivot spacer includes a plurality of second ribs engageable with the first ribs for selectively and rotationally positioning the pivot spacer relative to the mount body. The pivot spacer may be rotatable around at least a portion of the mount body during assembly of the mount. The mount may also include a pivot pin defining a pivot pin hole and the mount body may define a bore receiving the pivot pin. The fastener rigidly secures the knuckle and the pivot spacer to the pivot pin. The mount body may define a slot contiguous with the bore, the slot having an arcuate length extending perpendicular to the axis. The fastener extends through the slot and travels along the slot when the pivot space is being selectively and rotationally positioned. The fastener may threadingly engage the pivot pin.

The pivot spacer may have a front side and a back side, the plurality of second ribs formed on the front side. The knuckle may include a first plurality of teeth and the pivot spacer may include a second plurality of teeth on the back side engageable with the first plurality of teeth to selectively and rotationally position the pivot spacer relative to the knuckle during assembly of the mount. The first plurality of teeth and the second plurality of teeth may be circumferentially spaced. The knuckle may include a third plurality of teeth and the handheld electronic device mount may include a fourth plurality of teeth engageable with the third plurality of teeth to selectively and rotationally position the handheld electronic device mount relative to the knuckle during assembly of the mount. The third plurality of teeth and the fourth plurality of teeth may be circumferentially spaced.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
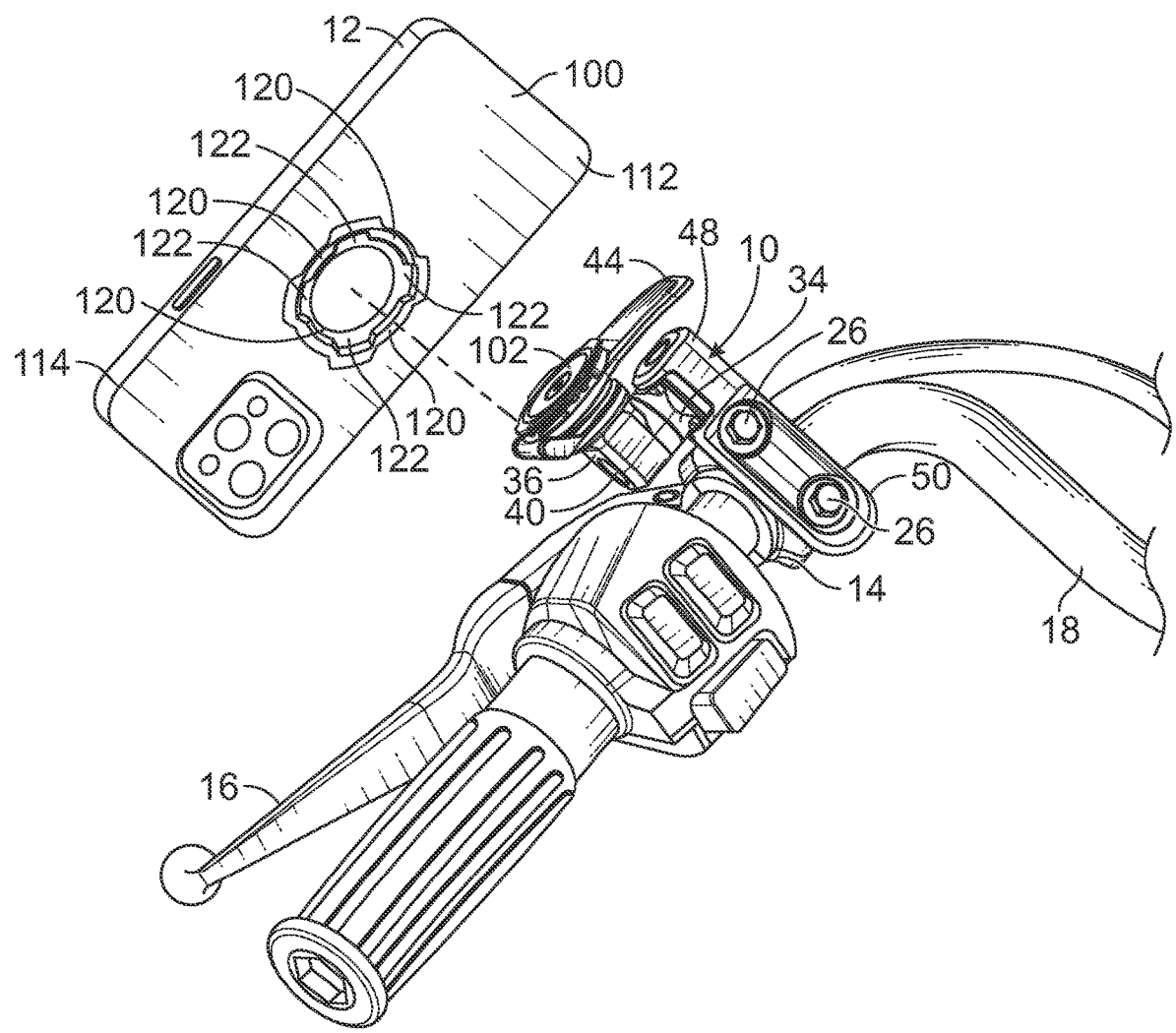
FIG. 1 is a perspective view of a mount in accordance with an illustrated embodiment of the present disclosure mounting a smartphone to a clamp of a brake clutch of a motorcycle.
Figure 2:
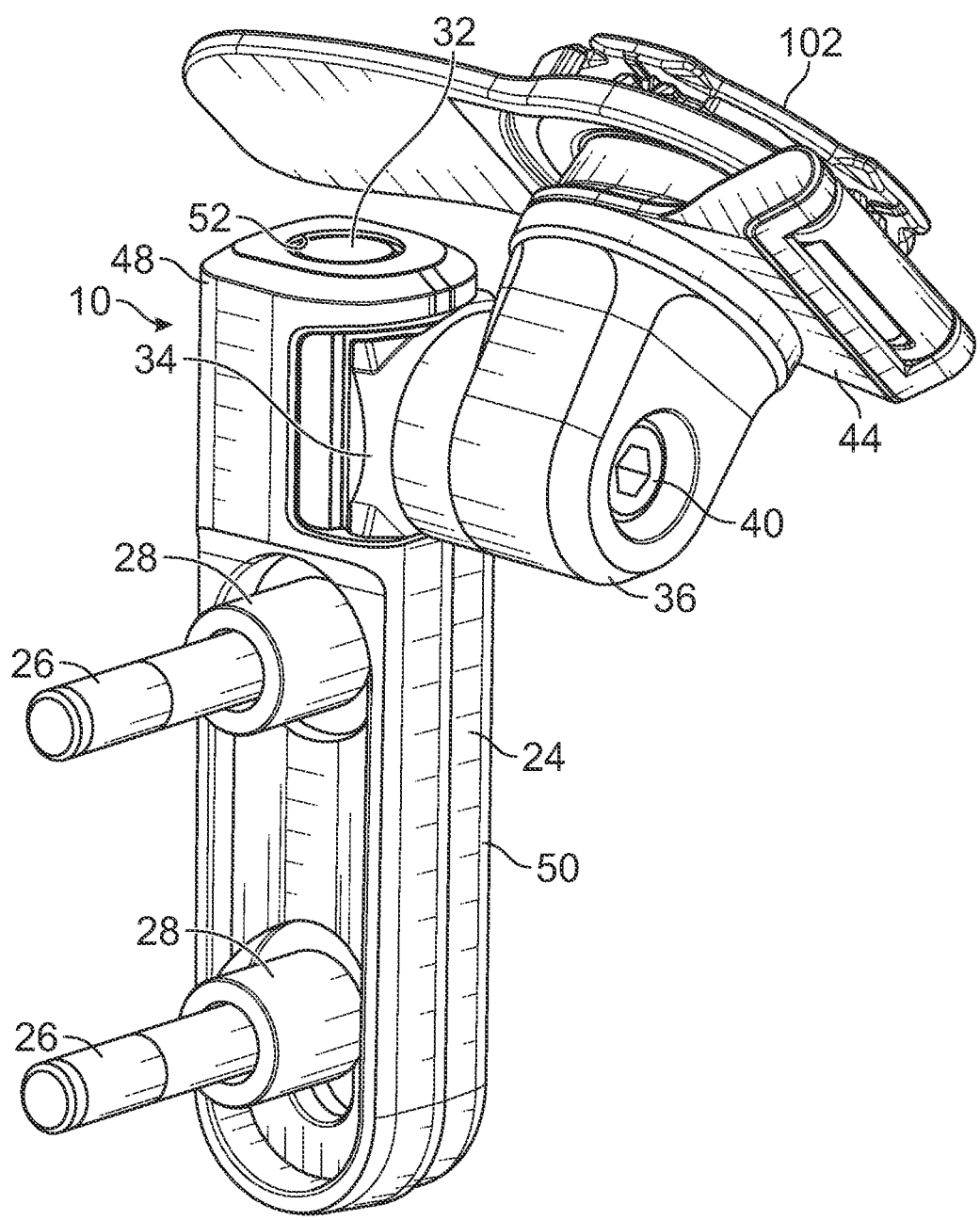
FIG. 2 is a perspective view of the mount of FIG. 1.
Figure 3:
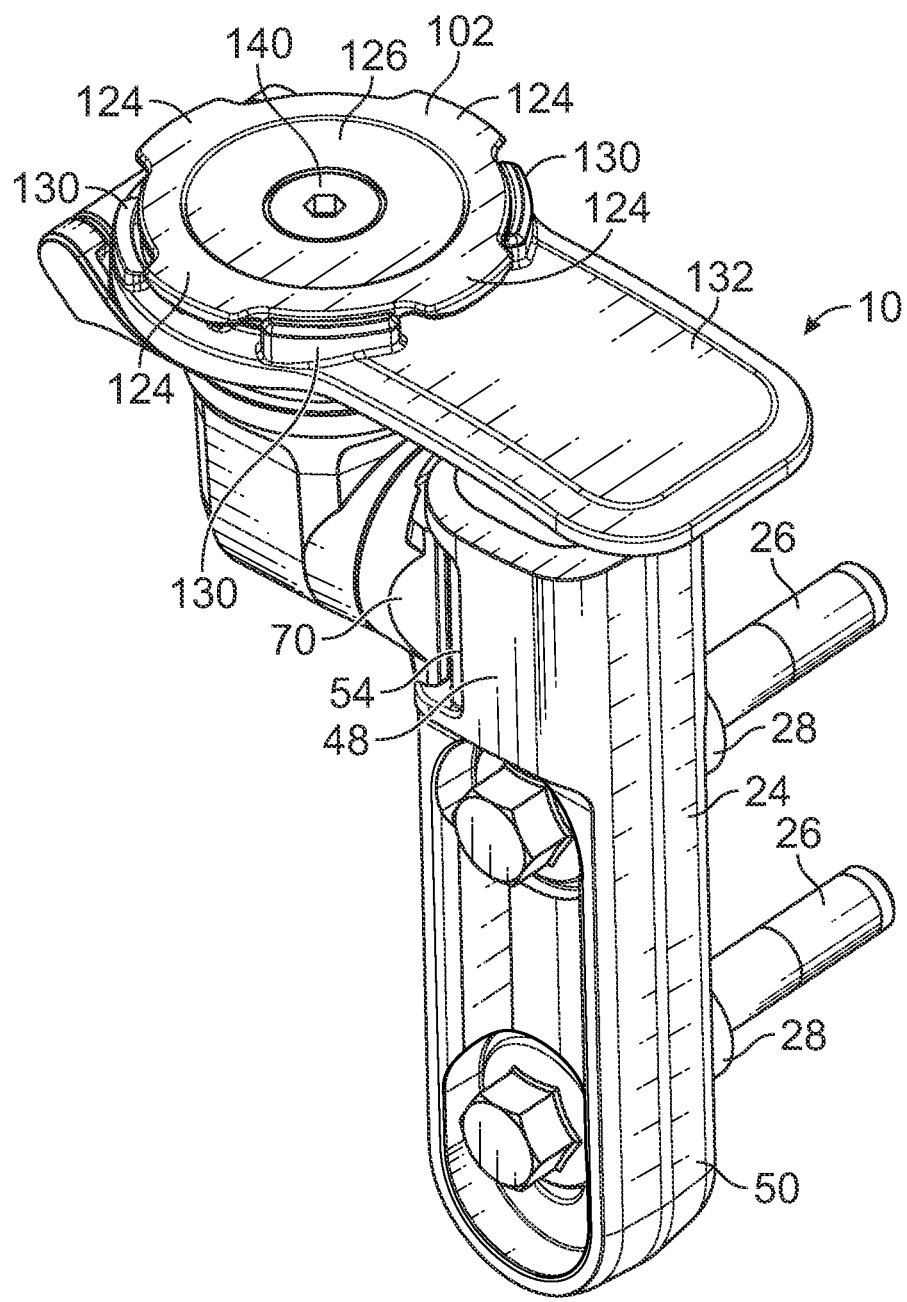
FIG. 3 is another perspective view of the mount of FIG. 1.
Figure 4:
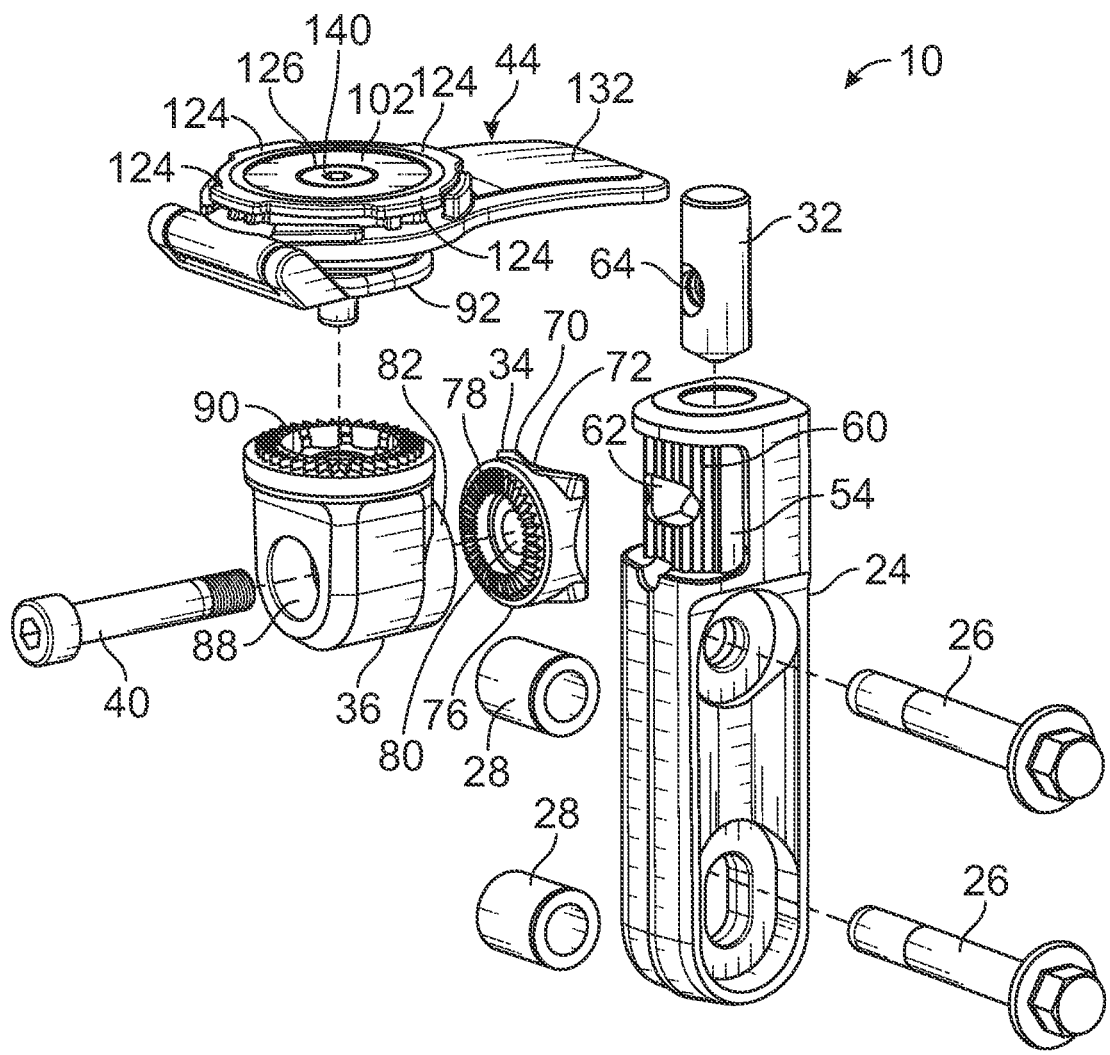
FIG. 4 is an exploded view of the mount of FIG. 1.

An illustrated embodiment of a mount 10 for mounting a smartphone or other handheld electronic device 12 to a brake clamp 14 of a brake clutch 16 secured to a handlebar 18 of a motorcycle, is shown in FIGS. 1-4. The mount 10 includes an elongate mount body 24, a pair of bolts 26, a pair of spacers 28, a pivot pin 32, a pivot spacer 34, a knuckle 36, a screw or other fastener 40 and a handheld electronic device mount 44.

The illustrated mount body 24 includes an upper portion 48 and a lower portion 50. The upper portion 48 defines a bore 52 for receiving the pivot pin 32 and includes an arcuate front face 54 that extends around a portion of the perimeter of the upper portion. The front face 54 includes a plurality of ribs 60 extending parallel to a central longitudinal axis of the mount body 24 and defines an arcuate slot 62 extending perpendicular to the axis of the mount body 24. The pivot pin 32 defines a threaded hole 64. The pivot spacer 34 includes a front side 70 that defines a plurality of ribs 72 for adjustably engaging the ribs 60 of the mount body 24 to selectively and rotationally position the pivot spacer relative to the mount body 24 during assembly of the mount 10. The ribs 72 extend perpendicular to the axis of the mount body 24 when the pivot spacer 34 is engaged with the mount body.

The pivot spacer 34 includes a back side 76 that includes a plurality of circumferentially-spaced teeth 78. The pivot spacer 34 also defines a through hole 80. The knuckle 36 includes a plurality of circumferentially-spaced teeth 82 to engage the plurality of circumferentially-spaced teeth 78 of the pivot spacer 34 to selectively and rotationally position the knuckle relative to the pivot spacer during assembly of the mount 10. The knuckle 36 also defines a through hole 88. The screw 40 extends through the hole 88 of the knuckle 36, the hole 80 of the pivot spacer 34, the slot 62 of the upper portion 48 and the threaded hole 64 of the pivot pin 32 to threadingly engage the pivot pin and to rigidly secure together the knuckle, the pivot spacer, the pivot pin and the mount body 24. The screw 40 travels along the slot 62 when the pivot pin 32 is being selectively and rotationally positioned during assembly of the mount 10. The slot 62 permits selective positioning of the pivot spacer 34 relative to the mount body 24 because it permits rotational movement of the pivot spacer partially around the mount body before the screw 40 is tightened to rigidly secure it to the pivot pin 32 during assembly of the mount 10. In one embodiment, the pivot spacer 34 may rotate 40 degrees around the front face 54 but may rotate more or less in accordance with other embodiments.

The plurality of circumferentially-spaced teeth 90 of the illustrated knuckle 36 face in a direction perpendicular to the circumferentially-spaced teeth 82. The handheld electronic device mount 44 also includes a plurality of circumferentially spaced teeth 92 that engage the circumferentially spaced teeth 90 to permit rotation of the handheld electronic device mount to selectively position the handheld electronic device mount relative to the knuckle 36 during assembly of the mount 10.

In an illustrated embodiment, the handheld electronic device 12 includes a case 100 having an interface 102 and the case has a mounting interface 104 for securing together the handheld electronic device and the handheld electronic device mount 44 in a manner known in the art. In this regard, the case 100 of the handheld electronic device 204 includes a rear wall 112 and a perimeter wall 114. A receiver 118 is formed in rear wall 112 and includes a series of case tabs 120 separated by gaps 122. A series of mount tabs 124 extend outward from attachment plate 126 of the handheld electronic device mount 44 for engagement with case tabs 120 to attach the handheld electronic device mount 12 with mount 10. Mount tabs 124 pass through gaps 122 and the handheld electronic device 12 is rotated relative to mount 10 to engage mount tabs 124 with case tabs 120. Lock tabs 130 on paddle 132 fall into gaps 122 and engage with case tabs 120 to block removal of handheld electronic device 12 from mount 10 at the selection of a user. The user may move paddle 132 relative to attachment plate 126 to pull lock tabs 130 out of gaps 122 and allow rotation and removal of handheld electronic device 12 from mount 10. The handheld electronic device mount 44 also include a fastener 140 that secures the handheld electronic device mount 44 to the knuckle 36. The electronic handheld device 12 may be mounted to the handheld electronic device mount 44 to be adjustable relative to the handheld electronic device mount in any other suitable manner in accordance with other embodiments of the present disclosure. The case 100 of the handheld electronic device 12 may also be coupled to the handheld electronic device mount 44 such that the case is not adjustable relative to the handheld electronic device mount in accordance with other embodiments of the present disclosure. Additionally, the handheld electronic device 12 may be mounted directly to the handheld electronic device mount 44 or may be coupled to any accessory or other structure coupled to the handheld electronic device mount 44 in accordance with other embodiments of the present disclosure. The case 100 of the handheld electronic device 12 may be a separable component of the handheld electronic device 12 or may be integral with the other components of the handheld electronic device.

The illustrated brake clutch 16, which is known in the art, is secured to the handlebar of a motorcycle by the clamp 14 and a pair of bolts. The illustrated mount 10 is secured to the clamp 14 of the brake clutch 16 by bolts 26. In the illustrated embodiment, the bolts 26 are used instead of the bolts originally sold or used with the illustrated brake clutch because bolts 26 are longer to accommodate the thickness of the mount body 24 and the spacers 28. Thus, during installation of the mount 10, the bolts 26 replace the bolts originally sold or used with the illustrated brake clutch. The spacers 28 prove space between the mount 10 and the clamp 14 to offset the mount 10 from the handlebar 18 of the motorcycle to provide clearance from other motorcycle components such as, for example, handlebar controls and mirror stem. The brake clutch 16 may be any other suitable type of brake clutch.

Assembly of the mount 10 may occur prior to or after securing the mount to the clamp 14. During assembly, the pivot spacer 34 is selectively rotated to the desired position relative to the mount body 24, the knuckle 36 is selectively rotated to the desired position relative to the pivot spacer, the handheld electronic device mount 44 is selectively rotated to the desired position relative to the knuckle, and the handheld electronic device 12 is selectively rotated to the desired position relative to handheld electronic device mount 44. Once the screw 40 is tightened to rigidly secure it to the pivot pin 32, the pivot spacer 34 is no longer rotatable relative to the mount body 24 and the knuckle 36 is no longer rotatable relative to the pivot spacer.

The mount 10 in accordance with an illustrated embodiment of the present disclosure is not only securable to a clamp of a brake clutch, it also provides at several different manners of adjusting the positioning of the handheld electronic device 12 during mounting of the handheld electronic device 12: (1) the pivot spacer 34 is rotationally and selectively positionable relative to the mount body 24; (2) the knuckle 36 is rotationally and selectively positionable relative to the pivot spacer 34; (3) the handheld electronic device mount 44 is rotationally and selectively positionable relative to the knuckle 36; and (4) the handheld electronic device 12 is rotationally and selectively positionable relative to handheld electronic device mount 44. Each of these manners of adjustment may be eliminated or modified in accordance with other embodiments of the present disclosure. Additionally, the components of the mount 10 that permit such adjustability may be modified to achieve similar or different types of adjustability in accordance with other embodiments of the present disclosure.

Some non-limiting examples of the above-described embodiments can include the following:

1. A mount for mounting a handheld electronic device to a clamp of a brake clutch of a motorcycle defining a pair of clamp holes the mount comprising:
    a mount body defining a pair of mount body holes;
    a pair of spacers for spacing the mount body from the clamp when the mount is secured to the clamp, each spacer defining a spacer hole;
    a pair of bolts, each bolt receivable by a respective mount body hole, a respective spacer hole and a respective clamp hole for securing the mount to the clamp;
    a pivot spacer selectively positionable relative to the mount body during assembly of the mount;
    a knuckle selectively positionable relative to the pivot spacer during assembly of the mount;
    a handheld electronic device mount selectively positionable relative to the knuckle; and
    a fastener for rigidly securing the pivot spacer and the knuckle to the mount body.
2. The mount of 1 wherein the mount body has a longitudinal axis and includes a plurality of first ribs extending parallel to the axis and wherein the pivot spacer includes a plurality of second ribs engageable with the first ribs for selectively and rotationally positioning the pivot spacer relative to the mount body.

3. The mount of 2 wherein the pivot spacer is rotatable around at least a portion of the mount body during assembly of the mount.

4. The mount of 3 further comprising a pivot pin defining a pivot pin hole and wherein the mount body defines a bore receiving the pivot pin, the fastener for rigidly securing the knuckle and the pivot spacer to the pivot pin.

5. The mount of 4 wherein the mount body further defines a slot contiguous with the bore, the slot having an arcuate length extending perpendicular to the axis, the fastener extending through the slot and traveling along the slot when the pivot spacer is being selectively and rotationally positioned relative to the mount body.

6. The mount of 5 wherein the fastener threadingly engages the pivot pin.

7. The mount of 2 wherein the pivot spacer has a front side and a back side, the plurality of second ribs formed on the front side.

8. The mount of 7 wherein the knuckle includes a first plurality of teeth and wherein the pivot spacer includes a second plurality of teeth on the back side engageable with the first plurality of teeth to selectively and rotationally position the pivot spacer relative to the knuckle during assembly of the mount.

9. The mount of 8 wherein the first plurality of teeth are circumferentially-spaced and the second plurality of teeth are circumferentially-spaced.

10. The mount of 9 wherein the knuckle includes a third plurality of teeth and the a handheld electronic device mount includes a fourth plurality of teeth engageable with the third plurality of teeth to selectively and rotationally position the handheld electronic device mount relative to the knuckle during assembly of the mount.

11. The mount of 10 wherein the third plurality of teeth are circumferentially-spaced and the fourth plurality of teeth are circumferentially-spaced.

12. The mount of 1 wherein the pivot spacer is rotatable relative to the mount body during assembly of the mount to selectively position the pivot pin relative to the mount body, the knuckle is rotatable relative to the pivot spacer during assembly of the mount to selectively position the knuckle relative to the pivot spacer, the handheld electronic device mount is rotatable relative to the knuckle during assembly of the mount to selectively position the handheld electronic device mount relative to the knuckle.

13. The mount of 12 further comprising a pivot pin defining a pivot pin hole and wherein the mount body defines a bore receiving the pivot pin, the fastener for rigidly securing the knuckle and the pivot spacer to the pivot pin.

14. The mount of 13 wherein the mount body further has a longitudinal axis and defines a slot contiguous with the bore, the slot having an arcuate length extending perpendicular to the axis, the fastener extending through the slot and traveling along the slot when the pivot spacer is being selectively and rotationally positioned relative to the mount body.

15. The mount of 14 wherein the fastener threadingly engages with the pivot pin.

16. The mount of 12 wherein the mount body has a longitudinal axis and includes a plurality of first ribs extending parallel to the axis and wherein the pivot spacer includes a plurality of second ribs engageable with the first ribs for selectively and rotationally positioning the pivot spacer relative to the mount body.

17. The mount of 12 wherein the knuckle includes a first plurality of teeth and wherein the pivot spacer includes a second plurality of teeth on the back side engageable with the first plurality of teeth to selectively and rotationally position the pivot spacer relative to the knuckle during assembly of the mount.

18. The mount of 12 wherein the knuckle includes a first plurality of teeth and the handheld electronic device mount includes a second plurality of teeth engageable with the first plurality of teeth to selectively and rotationally position the handheld electronic device mount relative to the knuckle during assembly of the mount.

As used in the foregoing description, the terms "front", "back", "upper" and "lower" simply refer to an orientation of the illustrated structure and are not intended to be limiting to the scope of the disclosure.

The components of the mount 10 may be secured together in any other manner in accordance with other embodiments of the present disclosure. Additionally, all of the components of the mount 10 may have other constructions or may be eliminated in accordance with other embodiments of the present disclosure.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A mount for mounting a handheld electronic device to a clamp of a motorcycle component defining a pair of clamp holes, the mount comprising:
    a mount body defining a pair of mount body holes;
    a pair of spacers for spacing the mount body from the clamp when the mount is secured to the clamp, each spacer defining a spacer hole;
    a pair of bolts, each bolt receivable by a respective mount body hole, a respective spacer hole, and a respective clamp hole for securing the mount to the clamp;
    a pivot spacer selectively positionable relative to the mount body;
    a knuckle selectively positionable relative to the pivot spacer;
    a handheld electronic device mount selectively positionable relative to the knuckle;
    a fastener extending through the pivot spacer and the knuckle for rigidly securing the pivot spacer and the knuckle to the mount body; and
    a pivot pin defining a pivot pin hole,
    wherein the mount body defines a bore receiving the pivot pin, and the fastener extends into the pivot pin hole for rigidly securing the knuckle and the pivot spacer to the pivot pin.

2. The mount of claim 1 wherein the mount body further defines a slot aligned with the bore, the slot having an arcuate length extending perpendicular to a longitudinal axis of the mount body, the fastener extending through the slot and traveling along the slot when the pivot spacer is being selectively and rotationally positioned relative to the mount body.

3. The mount of claim 2 wherein the fastener threadingly engages the pivot pin.

4. The mount of claim 1 wherein the mount body has a longitudinal axis and includes a plurality of first ribs extending parallel to the axis and wherein the pivot spacer includes a plurality of second ribs engageable with the first ribs for selectively and rotationally positioning the pivot spacer relative to the mount body.

5. The mount of claim 2 wherein the pivot spacer is selectively rotatable around at least a portion of the mount body.

6. The mount of claim 4 wherein the pivot spacer has a front side and a back side, the plurality of second ribs formed on the front side.

7. The mount of claim 6 wherein the knuckle includes a first plurality of teeth and wherein the pivot spacer includes a second plurality of teeth on the back side engageable with the first plurality of teeth to selectively and rotationally position the pivot spacer relative to the knuckle.

8. The mount of claim 7 wherein the first plurality of teeth are circumferentially-spaced and the second plurality of teeth are circumferentially-spaced.

9. The mount of claim 8 wherein the knuckle includes a third plurality of teeth and the handheld electronic device mount includes a fourth plurality of teeth engageable with the third plurality of teeth to selectively and rotationally position the handheld electronic device mount relative to the knuckle.

10. The mount of claim 9 wherein the third plurality of teeth are circumferentially-spaced and the fourth plurality of teeth are circumferentially-spaced.

11. The mount of claim 1 wherein the pivot spacer is rotatable relative to the mount body to selectively position the pivot spacer relative to the mount body, the knuckle is rotatable relative to the pivot spacer to selectively position the knuckle relative to the pivot spacer, the handheld electronic device mount is rotatable relative to the knuckle to selectively position the handheld electronic device mount relative to the knuckle.

12. The mount of claim 11 wherein the mount body has a longitudinal axis and includes a plurality of first ribs extending parallel to the axis and wherein the pivot spacer includes a plurality of second ribs engageable with the first ribs for selectively and rotationally positioning the pivot spacer relative to the mount body.

13. The mount of claim 11 wherein the knuckle includes a first plurality of teeth and wherein the pivot spacer includes a second plurality of teeth on the back side engageable with the first plurality of teeth to selectively and rotationally position the pivot spacer relative to the knuckle during assembly of the mount.

14. The mount of claim 11 wherein the knuckle includes a first plurality of teeth and the handheld electronic device mount includes a second plurality of teeth engageable with the first plurality of teeth to selectively and rotationally position the handheld electronic device mount relative to the knuckle.

15. The mount of claim 11 wherein the mount body further has a longitudinal axis and defines a slot aligned with the bore, the slot having an arcuate length extending perpendicular to the axis, the fastener extending through the slot and traveling along the slot when the pivot spacer is being selectively and rotationally positioned relative to the mount body.

16. The mount of claim 15 wherein the fastener threadingly engages the pivot pin.

\* \* \* \* \*